United States Patent [19]

Arrington-Webb et al.

[11] Patent Number: 5,584,924
[45] Date of Patent: Dec. 17, 1996

[54] OPACIFYING KAOLIN CLAY PIGMENTS HAVING IMPROVED RHEOLOGY AND PROCESS FOR THE MANUFACTURE THEREOF

[75] Inventors: Lee A. Arrington-Webb, Sandersville; Prakash B. Malla, Martinez, both of Ga.

[73] Assignee: Thiele Kaolin Company, Sandersville, Ga.

[21] Appl. No.: 296,493

[22] Filed: Aug. 26, 1994

[51] Int. Cl.$^6$ ............................ C04B 14/10; C04B 14/26
[52] U.S. Cl. ........................ 106/486; 106/464; 106/468; 106/416
[58] Field of Search ...................... 501/147, 148; 106/464, 465, 468, 486, 487, 416; 423/118.1, 328.1

[56] References Cited

U.S. PATENT DOCUMENTS

| | | | |
|---|---|---|---|
| 3,586,523 | 6/1971 | Fanselow et al. | |
| 4,812,299 | 3/1989 | Wason | 423/328 |
| 4,816,074 | 3/1989 | Raythatha et al. | 501/147 |
| 5,089,056 | 2/1992 | Shi et al. | 106/486 |
| 5,120,365 | 6/1992 | Kogler | 106/415 |
| 5,151,124 | 9/1992 | Rice | 106/416 |

*Primary Examiner*—Mark L. Bell
*Assistant Examiner*—Michael Marcheschi
*Attorney, Agent, or Firm*—Jones & Askew

[57] ABSTRACT

An opacifying kaolin clay pigment with improved rheological properties and good opacifying characteristics is manufactured by a process which comprises reacting a mixture of water, kaolin clay and calcium carbonate with a hydroxide component at a temperature of at least 60° C.

29 Claims, No Drawings

OPACIFYING KAOLIN CLAY PIGMENTS HAVING IMPROVED RHEOLOGY AND PROCESS FOR THE MANUFACTURE THEREOF

TECHNICAL FIELD

This invention relates to opacifying kaolin clay pigments. In a more specific aspect, this invention relates to opacifying kaolin clay pigments with improved rheological properties. This invention also relates to a process for manufacture of these kaolin clay pigments.

In this invention, the kaolin clay pigments are "structured kaolin clay pigments", a term referring to the kaolin clay aggregates which consist of a network of platelets bonded or otherwise interconnected together to form bulky porous bodies. Because of their bulky porous structure, these kaolin clay pigments have superior light scattering ability which is necessary for opacification in coated paper and for filled paper sheets. As described below, the aggregation or structuring of kaolin clay pigments can be achieved by chemical or thermal treatments. This invention should be understood as applicable to all types of structured kaolin clay pigments, especially those pigments modified by chemical treatment.

Specific examples of chemically-modified kaolin clay pigments are the kaolin materials disclosed in Shi et al. U.S. Pat. No. 5,089,056 and the zeolite materials disclosed in Wason U.S. Pat. No. 4,812,299.

Specific examples of thermally-modified kaolin clay pigments are the calcined kaolin clay materials described in Fanselow et al. U.S. Pat. No. 3,586,523.

Therefore, although especially useful in regard to the manufacture of chemically-modified kaolin clay materials, this invention is applicable to the manufacture of other structured kaolin clay materials.

BACKGROUND OF THE INVENTION

Kaolin is a naturally occurring, relatively fine, white clay which may be generally described as a hydrated aluminum silicate. Kaolin clay is widely used as a filler and a pigment in various materials, such as rubber and resins, and in various coatings, such as paints and coatings for paper.

The use of kaolin clay pigments in paper coatings serves, for example, to improve the opacity of the coated paper due to the light scattering ability of the kaolin clay pigment. Light scattering ability (or opacity) of the pigment can be estimated by the scattering coefficient as described in TAPPI, 1978, Vol. 61, No. 6, pages 78–80.

The light scattering ability, or opacifying characteristics, of kaolin clay may be enhanced by aggregating or structuring the minerals of the kaolin clay by chemical or thermal treatment as described above.

Despite their high opacifying characteristics, the usefulness of chemically-structured kaolin clay is limited by its poor rheological properties. In this application, the term "rheological properties" refers to the viscosity or flow characteristics of the structured clay materials, including structured kaolin clay.

The high viscosity of structured kaolin days disclosed in the prior art reduces their pumpability and poses problems in transferring the structured kaolin clay. Further, the high viscosity limits the use of structured kaolin clay in paper coating applications, especially in the high speed paper coating processes.

Therefore, a need exists in the kaolin industry for an opacifying kaolin clay pigment with improved rheological properties.

SUMMARY OF THE INVENTION

Briefly described, the present invention provides an opacifying kaolin clay pigment with improved rheological properties. This invention also provides a process for manufacturing kaolin clay pigments with improved rheological properties and good opacifying characteristics.

The process of this invention may broadly be described as reacting a mixture of kaolin clay and calcium carbonate with a hydroxide component and water at a temperature of at least 60° C.

In this application, the hydroxide component preferably is sodium hydroxide, potassium hydroxide, ammonium hydroxide, lithium hydroxide, cesium hydroxide, rubidium hydroxide or a mixture thereof. The hydroxide component (with water) should be in sufficient concentration to produce a molality of at least 0.1, and preferably at least 0.2. The solids concentration (calcium carbonate and kaolin clay) should be between 5 percent and 70 percent, with respect to the water.

The resultant product will be referred to as "modified kaolin clay" in this application. The modified kaolin clay is a chemically-structured pigment having improved rheological properties and good opacifying characteristics.

The process of this invention allows for additional steps. After the reaction, for example, the product may be leached by an iron reducing agent to remove discoloring constituents. Dispersants, colorants, stabilizers, etc. may be added at various times during the process of this invention.

The present invention provides a structured kaolin clay pigment which can be handled by conventional means (e.g., pumps) due to the improved rheological properties of the modified kaolin clay. By the term "improved rheological properties," we mean (a) that the flow characteristics of the modified kaolin clay are improved over the flow characteristics of conventional chemically-structured kaolin clays and (b) that the modified kaolin clay can be more easily worked or pumped by means which are conventional in the kaolin industry, depending on the desired use of the pigment.

Additionally, the modified kaolin clay produced by this invention is especially useful in applications when opacity is a desired feature. Thus, the modified kaolin clay is useful in paper coating applications, especially in high speed paper coating processes due to its improved rheology.

Accordingly, an object of this invention is to provide a modified opacifying kaolin clay pigment with improved rheological properties.

Another object of this invention is to provide an opacifying structured kaolin clay pigment with improved rheological properties and good opacifying characteristics.

A further object of this invention is to provide a process for manufacturing an opacifying kaolin clay pigment with improved rheological properties and good opacifying characteristics.

A still further object of this invention is to provide a process for manufacturing an opacifying kaolin clay pigment with improved rheological properties and good opacifying characteristics which can be used in paper coating applications.

A still further object of this invention is to provide a process for manufacturing an opacifying kaolin clay pigment with improved rheological properties and good opacifying characteristics which can be used in high speed paper coating applications.

These and other objects, features and advantages of this invention will become apparent from the following detailed description.

DETAILED DESCRIPTION OF THE INVENTION

In accordance with the present invention, kaolin clay pigments with improved rheology and good pacifying characteristics are manufactured by a process in which two sequential stages are employed.

In this invention, we have discovered that reacting a co-mineral blend of kaolin clay and calcium carbonate with a hydroxide component and water at a temperature of at least 60° C., can be effectively used to manufacture a structured kaolin clay pigment having improved rheological properties and good opacifying characteristics.

By the term "good opacifying characteristics," we mean the modified kaolin clay of this invention can be effectively used in those applications where opacity is a desired feature, such as in paper coatings.

This invention preferably utilizes natural kaolin clay as a starting material. In the first stage of this process, natural kaolin clay and calcium carbonate (preferably in a finely ground condition) are dispersed into water (preferably deionized) containing a hydroxide component and then thoroughly mixed to form a mixture containing a co-mineral blend. The co-mineral blend, on a dry weight basis, should be 50 percent to 95 percent kaolin and 5 percent to 50 percent calcium carbonate. In this application, the term "co-mineral blend" refers to the combination of kaolin clay and calcium carbonate materials. The solids concentration of the co-mineral blend, with respect to the water, should be between 5 percent and 70 percent by weight.

Equipment which is conventional in the kaolin industry can be used for first stage mixing. To ensure homogeneity of the mixture, the reagents should be subjected to first stage mixing until a substantially uniform mixture is obtained, and this may be determined by extraction, testing and/or observation of a sample.

After termination of the first stage mixing, the substantially uniform mixture is then reacted hydrothermally, in a second stage, in a closed vessel under conditions which promote good opacifying characteristics and improved rheological properties. Therefore, an essential feature of this invention is to select the second stage reaction conditions which will promote improved rheological properties while retaining good opacifying characteristics. These conditions can be, for example, variations in time, temperature, amount of hydroxide component, calcium carbonate amount, and any other factor which can be effectively used to achieve the desired results. The second stage may be carried out under autogeneous pressure.

A reaction temperature at least 60° C. should be achieved and then maintained for a period of time in the second stage. The viscosity of the modified kaolin clay is significantly improved where the co-mineral blend is about 25 percent calcium carbonate. While a reduction in the amount of hydroxide component may improve the viscosity and brightness of the modified kaolin clay, such reduction also reduces the light scattering ability of the modified kaolin clay.

In general terms, we have found that the two stages of this process require a total of at least about 15 minutes. As the reaction temperature in the second stage is increased above 60° C., this time requirement may be decreased.

The time required for the first or second stage is determined by the objective of that stage. More particularly, the first stage is continued until a substantially uniform mixture is obtained, and the second stage is continued until the modified kaolin clay (i.e., an opacifying kaolin clay pigment) has the desired improved rheological properties and good opacifying characteristics.

The opacity, or light scattering ability, of the final structured kaolin product is determined by the scattering coefficient, which is measured by the method described in TAPPI, 1978, Vol. 61, No. 6, pages 78–80. Preferably, the structured kaolin of this invention produces a scattering coefficient of from about 0.5 to about 1.6, most preferably at least about 0.8 (×1,000 sq. ft. per pound).

The viscosity, or rheological properties, of the final structured kaolin clay is determined by the TAPPI T648 om—88 method, using a Hercules high shear viscometer. Preferably, the structured clays of this invention will have a final Hercules viscosity of less than 850, preferably less than about 250 centipoises, at 50 percent solids.

As stated above, the molality of the hydroxide component (with water) is an essential feature of this invention and should be at least 0.1, and preferably at least 0.2. Depending upon the specific hydroxide (or mixture of hydroxides), the molality of the hydroxide component (with water) which is used in the examples described later in this application is preferably from 1.13 (referred to as "full" molality) to 0.57, which is referred to as "½" molality. Within this preferred range, the molality of the hydroxide component (with water) can also be 0.85, which is referred to as "¾" molality.

The process of this invention involves a reaction, in the second stage, between the kaolin clay particles, calcium carbonate and the hydroxide component. However, while this reaction produces modified kaolin clay particles, such reaction is not a full reaction. An essential objective of the second stage is to select the reaction conditions so that a full reaction is avoided. A "full reaction" occurs when the kaolin clay particles are converted into zeolite particles. (Stated another way, zeolite particles are produced when the structure and characteristics of the starting kaolin day particles are destroyed.) More particularly, the process of this invention is conducted so that even partial zeolite formation is avoided.

The present invention is further illustrated by the following examples which are illustrative of certain embodiments designed to teach those of ordinary skill in the art how to practice this invention and to represent the best mode contemplated for carrying out this invention.

In the following examples, the terms "KF90" and "EG55" refer to kaolin clays sold under the trade designations Kaofine 90 and EG55 by Thiele Kaolin Company, Sandersville, Ga.

EXAMPLES 1–3

In Example 1, 1000 grams of KF90 kaolin clay is dispersed into 5375 grams of deionized water with the full amount of hydroxides (potassium hydroxide: sodium hydroxide in a 2:1 molar ratio). The sample is hydrothermally reacted in a Parr pressure reactor for 15 minutes at 150° C. under constant stirring. The sample is filtered and washed twice with deionized water by allowing the deionized water to filter through the filter cake. The filter cake is suspended in water to approximately 20 percent to 30 percent solids and spray dried. The dried product is dispersed to between 45 percent and 60 percent solids using a low shear mixer. Between 2–10 pounds per ton sodium polyacrylate is then added to the sample to minimize viscosity. The sample from Example 1 is evaluated and, as shown in Table 1, the resulting conventionally structured kaolin clay has a scattering coefficient of 1.52 and a Hercules viscosity of 1528 centipoises at 45 percent solids.

In Example 2, 1000 grams of the specified co-mineral blend is dispersed into 5375 grams of deionized water with the full amount of hydroxides (as in Example 1). The co-mineral blend is composed of 700 grams kaolin clay, and 300 grams of calcium carbonate (sold under the trade designation Hydrocarb 90 by Omya Co.). The sample is hydrothermally reacted in a Parr pressure reactor for 15 minutes at 150° C. under constant stirring. The sample is filtered and washed twice with deionized water by allowing the deionized water to filter through the filter cake. The filter cake is suspended to approximately 20 percent to 30 percent solids and spray dried. The dried product is suspended to between 45 percent and 60 percent solids using a low shear mixer. Between 2–10 pounds per ton sodium polyacrylate is then added to the sample to minimize viscosity. The slurry is dispersed at the highest possible solids then lowered. The sample from Example 2 is evaluated, and the results shown in Table 1.

addition of calcium carbonate lowered the scattering coefficient from 1.5 to about 1.05.

With regard to Example 2, we believe that, due to an error in the preparation or evaluation of the product, either the solids content is lower than indicated or the Hercules viscosity is higher than indicated. Therefore, the process and reaction materials of Example 2 are duplicated to produce Example 2a.

TABLE 1

| Example | Kaolin (%) | Calcium Carbonate (%) | Hydroxide Component | Time (min) | Temp (C.) | GE Bri | Hunter b Value | Scattering coefficient | Solids (%) | Hercules Viscosity (cps) |
| --- | --- | --- | --- | --- | --- | --- | --- | --- | --- | --- |
| 1 | 100 KF90 | 0 | Full | 15 | 150 | 89.3 | 3.26 | 1.52 | 45.0 | 1528 |
| 2 | 70 KF90 | 30 | Full | 15 | 150 | 91.5 | 2.04 | 0.88 | 59.5 | 35 |
| 2a | 70 KF90 | 30 | Full | 15 | 150 | 91.2 | 2.47 | 1.05 | 58.1 55.0 | 3438 404 |
| 3 | 70 KF | 30 | Full | 15 | 150 | 90.9 | 2.56 | 1.05 | 54.0 51.4 | 695 24 |

EXAMPLES 4–5

Example 4 is prepared as in Example 2 except that the amount of hydroxide component is reduced by 25 percent. The results from the evaluation of Example 4 are shown in Table 2.

Example 5 is prepared as in Example 2 except that the amount of hydroxide component is reduced by 50 percent. The results from the evaluation of Example 5 are shown in Table 2.

The scatter data in Table 2 indicates that a reduction in the amount of hydroxide component reduces the scattering coefficient. However, brightness and viscosity are improved by a reduction in the amount of hydroxide component.

Example 3 is prepared as in Example 2. The results from the evaluation of Example 3 are shown in Table 1.

The viscosity data in Table 1 indicates that the conditions of Example 1 produce a product with high viscosity. On the other hand, the viscosity data in Table 1 indicates that reacting a co-mineral blend of kaolin clay and calcium carbonate produces a chemically-structured kaolin clay pigment with improved rheological properties.

Further, the brightness data indicates that brightness improved by 1.6–2.1 points with the addition of calcium carbonate. However, the scattering data indicates that the

TABLE 2

| Example | Kaolin (%) | Calcium Carbonate (%) | Hydroxide Component | Time (min) | Temp (C.) | GE Bri | Hunter b Value | Scattering coefficient | Solids (%) | Hercules Viscosity (cps) |
| --- | --- | --- | --- | --- | --- | --- | --- | --- | --- | --- |
| 4 | 70 KF90 | 30 | ¾ | 15 | 150 | 91.7 | 1.86 | 0.92 | 55.5 52.7 | 226 16 |
| 5 | 70 KF90 | 30 | ½ | 15 | 150 | 92.3 | 1.90 | Not Done | 64.4 | 1146 |

EXAMPLE 6

Example 6 is prepared as in Example 2 except that the reaction time is increased from 15 minutes to 120 minutes. The results from the evaluation of Example 6 are shown in Table 3.

The brightness data in Table 3 indicates that the increase in reaction time has no appreciable effect on brightness.

TABLE 3

| Example | Kaolin (%) | Calcium Carbonate (%) | Hydroxide Component | Time (min) | Temp (C.) | GE Bri | Hunter b Value | Scattering coefficient | Solids (%) | Hercules Viscosity (cps) |
|---|---|---|---|---|---|---|---|---|---|---|
| 6 | 70 KF90 | 30 | Full | 120 | 150 | 90.8 | 2.85 | 0.98 | 55.4 50.5 | 1637 69 |

EXAMPLES 7–8

Example 7 is prepared as in Example 2 except that the reaction temperature is increased from 150° C. to 175° C. The results from the evaluation of Example 7 are shown in Table 4.

Example 8 is prepared as in Example 7 except that the amount of hydroxides is reduced by 25 percent. The results from the evaluation of Example 8 are shown in Table 4.

The viscosity data in Table 4 indicates that the increase in reaction temperature increases the viscosity of the modified kaolin clay.

The scatter data in Table 4 indicates that the increase in reaction temperature increases the scattering coefficient. However, brightness is increased by a reduction in the amount of the hydroxide component.

no appreciable effect on the light scattering ability of the modified kaolin clay.

The viscosity data in Table 5 indicates that the viscosity of a modified kaolin clay made with 30 percent calcium carbonate is better than that made with 20 percent calcium carbonate. However, the data indicates that a modified kaolin clay made with 25 percent calcium carbonate has the best viscosity of the three.

TABLE 4

| Example | Kaolin (%) | Calcium Carbonate (%) | Hydroxide Component | Time (min) | Temp (C.) | GE Bri | Hunter b Value | Scattering coefficient | Solids (%) | Hercules Viscosity (cps) |
|---|---|---|---|---|---|---|---|---|---|---|
| 7 | 70 KF90 | 30 | Full | 15 | 175 | 89.3 | 3.27 | 1.06 | 54.0 52.0 | 688 35 |
| 8 | 70 KF90 | 30 | ¾ | 15 | 175 | 90.6 | 2.76 | 1.06 | 58.4 56.0 52.1 | 1719 139 17 |

EXAMPLES 9–10

Example 9 is prepared as in Example 2 except that the amount of calcium carbonate is reduced to 250 grams and the amount of kaolin clay is increased to 750 grams. The results from the evaluation of Example 9 are shown in Table 5.

Example 10 is prepared as in Example 2 except that the amount of calcium carbonate is reduced to 200 grams and the amount of kaolin clay is increased to 800 grams. The results from the evaluation of Example 10 are shown in Table 5.

The brightness data in Table 5 indicates that the variation in calcium carbonate has no appreciable effect on brightness of the modified kaolin clay. Similarly, the scatter data in Table 5 indicates that the variation in calcium carbonate has

TABLE 5

| Example | Kaolin (%) | Calcium Carbonate (%) | Hydroxide Component | Time (min) | Temp (C.) | GE Bri | Hunter b Value | Scattering coefficient | Solids (%) | Hercules Viscosity (cps) |
|---|---|---|---|---|---|---|---|---|---|---|
| 9 | 75 KF90 | 25 | Full | 15 | 150 | 91.6 | 2.12 | 1.04 | 59.4 56.3 54.3 | 2292 313 17 |
| 10 | 80 KF90 | 20 | Full | 15 | 150 | 91.4 | 2.12 | 1.03 | 56.1 51.2 | 3125 23 |

EXAMPLES 11–13

Example 11 is prepared as in Example 1 except that the type of kaolin clay used is EG55 rather than KF90 and calcium carbonate is not used. The results are indicated in Table 6.

Example 12 is prepared as in Example 2 except that the type of kaolin clay used is EG55 rather than KF90. The results from the evaluation of Example 12 are shown in Table 6.

Example 13 is prepared as in Example 12 except that no hydroxides are used in the reaction. The results from the evaluation of Example 13 are shown in Table 6.

The brightness data in Table 6 indicates that the addition of calcium carbonate increases the brightness of chemically-modified EG55 kaolin clay more than the addition of calcium carbonate increases the brightness of chemically-modified KF90 kaolin clay.

TABLE 6

| Example | Kaolin (%) | Calcium Carbonate (%) | Hydroxide Component | Time (min) | Temp (C.) | GE Bri | Hunter b Value | Scattering coefficient | Solids (%) | Hercules Viscosity (cps) |
|---|---|---|---|---|---|---|---|---|---|---|
| 11 | 100 EG55 | 0 | Full | 15 | 150 | 85.2 | 4.72 | 1.38 | 45.2 | 2292 |
| 12 | 70 EG55 | 30 | Full | 15 | 150 | 88.4 | 3.56 | 0.95 | 54.9 | 1146 |
| 13 | 70 EG55 | 30 | None | 15 | 150 | 89.1 | 3.0 | 0.37 | 65.2 | 61 |

This invention has been described in detail with particular reference to certain embodiments, but variations and modifications can be made without departing from the spirit and scope of the invention as defined in the following claims.

What is claimed is:

1. A process for manufacturing opacifying kaolin clay pigments, wherein the process comprises the sequential steps of:

A. in a first stage, mixing kaolin clay particles with calcium carbonate, water and a hydroxide component to form a mixture containing a co-mineral blend; and B. in a second stage, reacting the mixture at a temperature of at least 60° C., wherein the formation of zeolite is avoided.

2. A process as defined by claim 1 wherein the calcium carbonate is finely ground.

3. A process as defined by claim 1 wherein the hydroxide component is sodium hydroxide.

4. A process as defined by claim 1 wherein the hydroxide component is potassium hydroxide.

5. A process as defined by claim 1 wherein the hydroxide component is a mixture of hydroxides.

6. A process as defined by claim 5 wherein the hydroxide component is a mixture of potassium hydroxide and sodium hydroxide in a 2:1 molar ratio.

7. A process as defined by claim 1 wherein the second stage is carried out under constant stirring.

8. A process as defined by claim 1 wherein the second stage is carried out under autogeneous pressure.

9. A process as defined by claim 1 wherein the co-mineral blend has between 50 percent and 95 percent kaolin clay particles.

10. A process as defined by claim 1 wherein the co-mineral blend has between 5 percent and 50 percent calcium carbonate.

11. A process as defined by claim 1 wherein the hydroxide component (with water) has a molality of at least 0.1.

12. A process as defined by claim 1 wherein the hydroxide component (with water) has a molality of at least 0.2.

13. A process as defined by claim 1 wherein the co-mineral blend has a solids concentration of between 5 percent and 70 percent with respect to the water.

14. A process defined by claim 1 wherein the second stage is carried out in a closed vessel.

15. A process as defined by claim 1 wherein the opacifying kaolin clay pigment is leached with a iron reducing agent to remove discoloring constituents.

16. An opacifying structured kaolin clay material with improved rheological properties manufactured by a process which comprises the sequential steps of:

A. in a first stage, mixing kaolin clay particles with calcium carbonate, water and a hydroxide component to form a mixture containing a co-mineral blend; and B. in a second stage, reacting the mixture at a temperature of at least 60° C., wherein the formation of zeolite is avoided.

17. An opacifying structured kaolin clay material as defined by claim 16 wherein the calcium carbonate is finely ground.

18. An opacifying structured kaolin clay material as defined by claim 16 wherein the hydroxide component is sodium hydroxide.

19. An opacifying structured kaolin clay material as defined by claim 16 wherein the hydroxide component is potassium hydroxide.

20. An opacifying structured kaolin clay material as defined by claim 16 wherein the hydroxide component is a mixture of hydroxides.

21. An opacifying structured kaolin clay material as defined by claim 20 wherein the hydroxide component is a mixture of potassium hydroxide and sodium hydroxide in a 2:1 molar ratio.

22. An opacifying structured kaolin clay material as defined by claim 16 wherein the second stage is carried out under constant stirring.

23. An opacifying structured kaolin clay material as defined by claim 16 wherein the second stage is carried out under autogeneous pressure.

24. An opacifying structured kaolin clay material as defined by claim 16 wherein the co-mineral blend has between 50 percent and 95 percent kaolin clay particles.

25. An opacifying structured kaolin clay material as defined by claim 16 wherein the co-mineral blend has between 5 percent and 50 percent calcium carbonate.

26. An opacifying structured kaolin clay material as defined by claim 16 wherein the hydroxide component (with water) has a molality of at least 0.1.

27. An opacifying structured kaolin clay material as defined by claim 16 wherein the hydroxide component (with water) has a molality of at least 0.2.

28. An opacifying structured kaolin clay material as defined by claim 16 wherein the co-mineral blend has a solids concentration of between 5 percent and 70 percent with respect to the water.

29. An opacifying structured kaolin clay material as defined by claim 16 wherein the second stage is carried out in a closed vessel.

* * * * *